R. CILLEY.
PHOTOGRAPHIC PRINTING APPARATUS.
APPLICATION FILED JAN. 12, 1910.
1,167,795.
Patented Jan. 11, 1916.
2 SHEETS—SHEET 1.
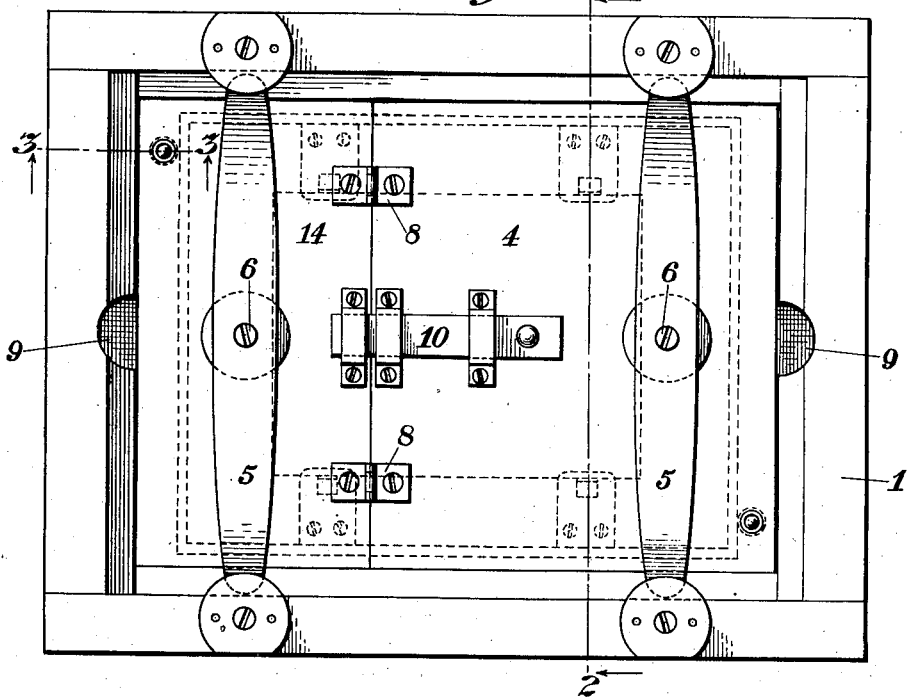
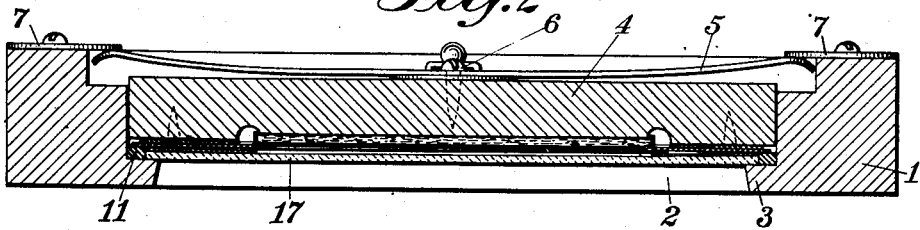
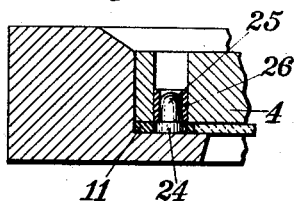
WITNESSES:
Chas. F. Clagett
George C. Klean
INVENTOR
Raymond Cilley

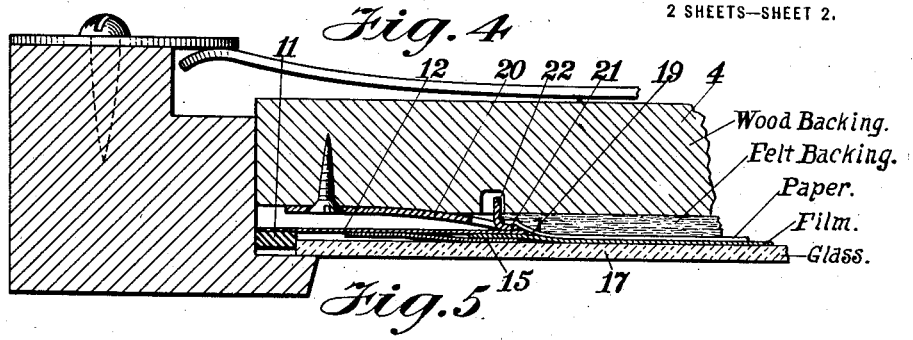
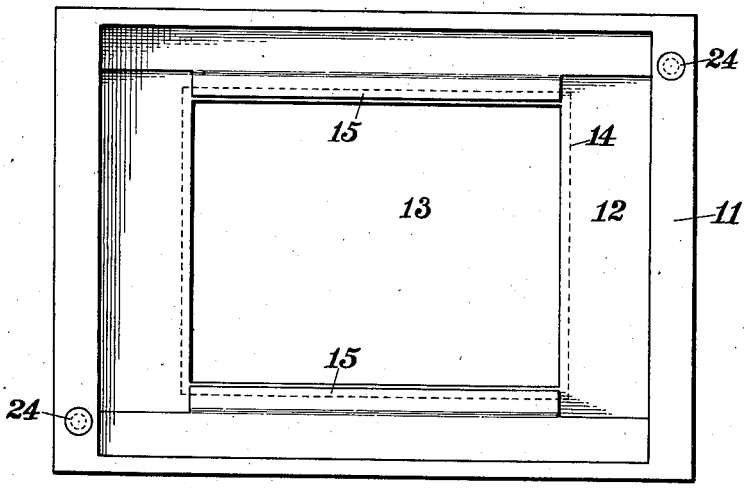
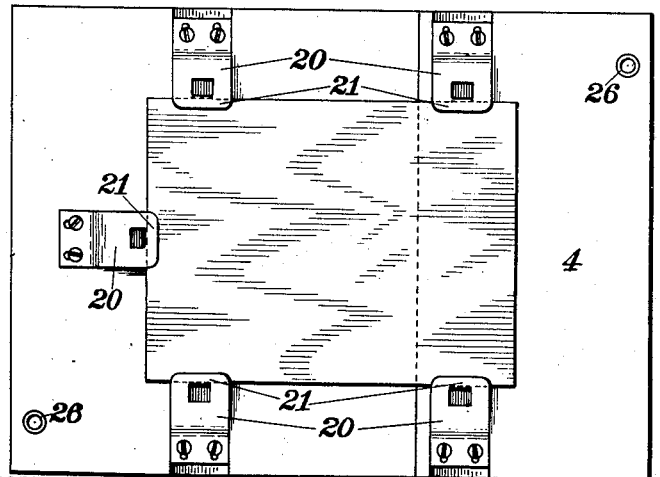

UNITED STATES PATENT OFFICE.

RAYMOND CILLEY, OF NEW YORK, N. Y.

PHOTOGRAPHIC-PRINTING APPARATUS.

1,167,795.      Specification of Letters Patent.      Patented Jan. 11, 1916.

Application filed January 12, 1910. Serial No. 537,756.

*To all whom it may concern:*

Be it known that I, RAYMOND CILLEY, a citizen of the United States, and a resident of New York city, borough of Brooklyn, county of Kings, State of New York, have invented certain new and useful Improvements in Photographic-Printing Apparatus, of which the following is a specification.

My present invention comprises certain improvements in apparatus for holding translucent patterns, such as photographs, in such manner as to leave the pattern or picture exposed for printing photographic reproductions. It is particularly adapted for use in printing photographs from film negatives. The film holder is preferably used in connection with a holder for the sensitive paper to be printed from the negative, and I prefer to employ special means for accurately presenting the paper holder to the film holder, so that the exposed region of the sensitive paper and the resulting picture will be accurately placed on the paper. The film holder is constructed so as to have the functions of a mat for the film to cover the unprinted edges thereof, and the securing means or clamps whereby the paper is secured to the paper holder are located behind the mat formed by the film holder, so that there is no projection within the margin of the field or "sight" portion of the negative.

An important object of the invention is to construct the film holder and the film clamping portions thereof of such material that the flexible and relatively delicate film will be firmly and securely held and yet the film clamping portions of the inner margin will be so thin and flexible as to permit sensitive paper of larger dimensions than the size of the film to be forced into intimate contact with the film and the film into intimate contact with the glass or equivalent transparent plate, through which the light is applied to effect the printing of the pattern of the negative upon the paper. According to my invention, this is accomplished by forming the film holder from a sheet of thin flexible metal cut in the form of a mat of such size as to cover the edges of the film and expose the sight portion thereof. The inner margin of this flexible sheet forms a clamping surface against which the film is clamped by coöperating members consisting of strips of thin, flexible metal secured to said first mentioned sheet at points somewhat remote from the printing opening. I prefer to secure these parts by soldering, or brazing, so as to leave the surfaces free from objectionable projections. The free edges of these strips adjacent the sight opening constitute the film clamp. The coöperating clamping strips are preferably thinner than the said mat sheet, and when the parts are assembled for use, said thinner strips are preferably presented on the side toward the glass, so that the film may be pressed against the glass backing by a slight flexure causing practically no distortion of the film or of the paper. Such a flexible film holding mat is preferably made much stiffer at the outer margin than toward the clamping edges adjacent the sight, and this may be accomplished by providing a peripheral solid metal frame to which the mat or film holding sheet is rigidly secured, as by solder, brazing or bending, or sufficient stiffness may be secured by bending alone. Preferably, this marginal thickening for purposes of stiffness is applied on one side only of the film clamping sheet, and the interior configuration thereof preferably fits the glass plate against which the paper and film are forced for printing purposes.

The film holder and glass are held in operative relation in any desired manner, and the paper may be applied to the side of the film and the film forced against the glass by any desired means. I prefer, however, to employ an auxiliary construction, which may be quite similar to the ordinary printing frame. Such a device may comprise the usual exterior square frame with a ledge or lip supporting the glass and a rigid back preferably supplied with a felt or other cushion surface adapted to apply firm elastic pressure to the paper and film. This back may be forced into elastic clamping position by means of the ordinary pivotal springs and clips commonly used for such purposes.

It will be obvious that my combined film holder and mat is usable separately in any relation where the film alone could be used, and furthermore that any desired means may be used for elastically forcing the paper against the film and the film against the glass, the ordinary printing frame construction being one desirable means of accomplishing this.

Another feature of my invention consists in applying paper holding clips rigidly or adjustably attached to rigid back of printing frame for accurately centering and holding the paper upon the elastic backing. These clips are also thin so as to permit the elastic backing to force the paper against the film without distortion or wrinkling.

With the film accurately centered and held in the film holding mat and the paper accurately centered and held upon the paper holding backing, it is only necessary to accurately fit or center the back with respect to the film and holder to insure uniform and accurate presentation of each successive sheet of printing paper to the film. For this purpose, I preferably provide dowels on the stiffened portion of the film holding mat and corresponding dowel holes in the paper holding backing. By making the dowels in the form of rounded cones, the backing with the paper clamped thereto, may be applied to the film holder with the film clamped therein without any special care, and yet the mere act of bringing the paper and film in printing proximity will necessarily operate to center the one with respect to the other.

By the use of my flexible film holder, particularly when made with stiff outer edges and provided with the above described centering devices, it is possible to employ various supplemental mats and screens of various kinds for screening certain portions of the negative or paper to produce an ornamental border, eliminate undesirable portions of the picture, or to combine portions of different negatives upon one print.

A useful embodiment of the various features constituting my invention is shown in the accompanying drawings, wherein the film holder is illustrated as arranged for use in connection with an exterior printing frame.

In the drawings: Figure 1 is a plan view of the rear side of the printing frame with the parts assembled ready for printing; Fig. 2 is a section on the line 2—2, of Fig. 1; Fig. 3 is a detail section on the line 3, 3 Fig. 1; Fig. 4 is a cross-sectional detail of the parts shown in Fig. 2, the arrangement and proportions of the flexible film holder and clamp being distorted and exaggerated in order better to illustrate the nature of the relations of parts shown in Fig. 2; Fig. 5 is a plan view of the film holder; Fig. 6 is a plan view of the paper holding backing.

The complete device comprises the exterior frame 1, formed with central opening 2, and inwardly projecting retaining ledge 3, the upper surface of which coöperates with the paper holding backing 4, when the latter is elastically clamped thereagainst, by locking spring 5, 5, pivoted at 6, 6 and engaging stationary clips 7, 7.

The backing may consist of sections 4, 14, hinged as at 8, 8, and the frame may be provided with finger holes 9, 9. All of the above described parts may be of any usual or known construction, except that where the backing is made in sections I prefer to provide means for locking as a locking bolt 10, whereby the sections may be rigidly locked together during assembly of the parts preparatory to making a print thereby preventing liability of relative swing of sections which might serve to loosen or displace the paper from beneath the clips.

My invention concerns more particularly the special construction and arrangement of parts which I apply to or use in connection with such frame.

The construction of the film holder and its preferred arrangement for use in connection with the other parts, is clearly indicated in Figs. 2, 4, and 5. In Fig. 5, it is shown as comprising the exterior stiffening frame 11 and a sheet of thin elastic, though strong material, such as metal, as, for instance, brass, about .004 to .005 inch in thickness. The sheet 12 is preferably secured against the side of the frame 11. This is preferably accomplished by soldering the adjacent faces in such manner as to leave no projections. The central portion of the sheet 12 is formed with an opening 13 of the desired size and has the special advantage that it may be the full size of the sight or picture portion of the negative. As indicated in dotted lines at 14, the negative may be secured over the opening 13 without screening more than a very narrow strip along two edges thereof, and these edges are preferably transverse to the natural curvature of the film, so that the film will be prevented from curling. The tendency of the film to curl will serve to increase the security of engagement thereof with the clamping devices.

The clamping devices preferably consist of strips of thin metal, which may be even thinner than the metal of the sheet 12. These strips may be secured to the sheet 12 as by soldering the same at points sufficiently remote so as to leave free the engaging lips or clamping portions 15. The latter coöperate with the edges of the sheet 12 to form a slit or groove into which the film may be inserted, either by sliding endwise into position or by bending transversely. When in position, the film will be held by the elasticity of the metal and by the resiliency of the film.

The above described film holder constitutes a means for supplying a film negative with a peripheral screen area capable of serving as a mat and with a rigid border convenient for handling and for centering the film with respect to sensitive paper. It is preferably used in connection with a sheet of glass, against which the film is forced by elastic pressure applied through the printing paper and the interior of the frame 11 is preferably of suitable dimensions to permit the glass sheet to be fitted therein against sheet 12. The preferred relation of the film holder and glass is shown in Fig. 2, wherein the film holder is shown as seated snugly within the printing frame 1. The rigid part 11 of the film holder surrounds and forms a centering frame for the glass 17.

In Fig. 4, the relations of the printing frame, glass, film, film holder, and paper have been very much distorted in order to show the manner in which parts coöperate when in actual use. By reference to said figure, it will be seen that the elastic backing must be of sufficient depth and resilience to force the paper downward a distance equal to the thickness of the paper holding clip 20 and the mat sheet 12, in order to come into contact with the film, and also the further distance necessary to bend the film a thickness equal to the thickness of the metal of the clamp 15, so as to clamp the film firmly between the paper and the glass, thereby insuring perfect contact over the entire area. The total distance of bending of film and paper must not be so great as to injure or wrinkle either of them, and is preferably made as small as possible. It will be noted that there may be a small portion exposed to the light, yet out of contact with the film, as indicated at 19; but with the thickness of metal specified above and with a proper elastic backing, this will be a minimum and will be unnoticeable in the print. The paper is held on the elastic backing by the thin metal clips 20 and clamping lips 21, and formed with integral portions 22 at right angles to the clamping surfaces adapted to serve as alining stops for the edges of the paper, these clips 20 may be adjustably mounted to accommodate paper of varying sizes.

The centering devices for insuring proper registry of the paper held by the paper holder with the film held by the film holder, are indicated in Figs. 1 and 3, wherein the frame 11 is shown as provided with a dowel having a base portion or shank 24 secured in the perforation therethrough. The dowel may be secured by spreading of the metal, as by riveting or punching. The projected portion 25 is formed as a cylinder with a rounded end. The bushing 26, adapted to accurately fit the cylindrical portion of the dowel, is inserted in the paper-holding backing 4. By use of such dowel, the registry of the parts may be made far more accurate than is possible if the fit within the exterior wooden frame were relied upon.

While I have herein fully shown and described, and have pointed out in the appended claims certain novel features of construction, arrangement and operation which characterize my invention, it will be understood by those skilled in the art that various omissions, substitutions, and changes in the forms, proportions, sizes, and details of the device and of its operation, may be made without departing from my invention.

I claim:

1. In an apparatus for printing from film negatives and similar flexible transparencies, a film holder formed with a printing opening therethrough, the material forming the edges of said opening being normally flexible, and means upon said holder for securing a film negative over said opening, in combination with a stiff, transparent sheet applied over one face of said film holder and means for forcing sensitive paper against the opposite face of said film to clamp said paper and film in close contact with said transparent sheet.

2. In an apparatus for printing from film negatives and similar flexible transparencies, a film holder formed with a printing opening therethrough, the material forming the edges of said opening being normally flexible, and means upon said holder for securing a film negative over said opening, in combination with a stiff, transparent sheet applied over one face of said film holder, and an elastic pad or back, whereby the film engaging portions of the film holder and the central portions of the film are flexed into close contact with said transparent sheet.

3. In an apparatus for printing from film negatives and similar flexible transparencies, a film holder formed with a stiff outer frame and with a printing opening therethrough, the material forming the edges of said opening being normally flexible, and means upon said holder for securing a film negative over said opening, in combination with a stiff, transparent sheet applied over one face of said film holder, and means for forcing sensitive paper against the opposite face of said film to clamp said paper and film in close contact with said transparent sheet.

4. In an apparatus for printing from film negatives and similar flexible transparencies, a film holder formed with a stiff outer frame and with a printing opening therethrough, the material forming the edges of said opening being normally flexible, and means upon said holder for securing a film negative over said opening, in combination with a stiff, transparent sheet applied over one face of said film holder, and an elastic pad or back of greater area than said opening, whereby the film engaging portions of the film holder and the central portions of the film are flexed into intimate contact with said transparent sheet.

5. In an apparatus for printing from film negatives and similar flexible transparencies, a film holder formed with a stiff outer frame and with a printing opening therethrough, the material forming the edges of said opening being normally flexible, and thin clips upon said holder for securing a film negative over said opening, in combination with a stiff, transparent sheet applied over one face of said film holder, and means for forcing sensitive paper against the opposite face of said film to clamp said paper and film in close contact with said transparent sheet.

6. In an apparatus for printing from film negatives and similar flexible transparencies, a film holder formed with a stiff outer frame and with a printing opening therethrough, the material forming the edges of said opening being normally flexible, and thin clips upon said holder for securing a film negative over said opening, in combination with a stiff, transparent sheet applied over one face of said film holder, and an elastic pad or back of greater area than said opening, whereby the film engaging portions of the film holder and the central portions of the film are flexed into intimate contact with said transparent sheet.

7. In an apparatus for printing from film negatives and similar flexible transparencies, a film holder formed with a stiff outer frame and with a printing opening therethrough, the material forming the edges of said opening being normally flexible, and thin flexible metal strips upon said holder for securing a film negative over said opening, in combination with a stiff, transparent sheet applied over one face of said film holder, and means for forcing sensitive paper against the opposite face of said film to clamp said paper and film in close contact with said transparent sheet.

8. In an apparatus for printing from film negatives and similar flexible transparencies, a film holder formed with a stiff outer frame and with a printing opening therethrough, the material forming the edges of said opening being normally flexible, and thin flexible metal strips upon said holder for securing a film negative over said opening, in combination with a stiff, transparent sheet applied over one face of said film holder, and an elastic pad or back of equal or greater area than said opening, whereby the film engaging portions of the film holder and the central portions of the film are flexed into intimate contact with said transparent sheet.

9. In an apparatus for printing from film negatives, etc., a metallic film holder having a printing opening therethrough, the portions thereof adjacent the edges of said opening being formed of thin flexible sheet metal and thin flexible sheet metal guides provided in coöperative relation to said edges, a holder for sensitive paper provided with paper holding clips located outside of the area of said printing opening in said film holder, in combination with a rigid transparent plate and means for forcing the paper holder against the film holder and the film holder against said plate, said film holder and paper holder being provided with registering guides whereby when the parts are assembled the paper holding clips are outside of the printing opening and are masked by the film holder.

10. In an apparatus for printing from film negatives, etc., a film holder having a printing opening therethrough the portions thereof adjacent to the edges of said opening being formed of thin sheet material and thin flexible guides provided in coöperative relation to said edges, a holder for sensitive paper provided with paper holding clips located outside of the area of said printing opening, a rigid transparent plate and means for forcing the paper holder against the film holder and the film holder against said plate in proper registering relationship.

Signed at New York city, in the county of New York, and State of New York, this seventh day of January, A. D. 1910.

RAYMOND CILLEY.

Witnesses:
GEORGE C. DEAN,
IRVING M. OBRIEGHT.